Figure 1:
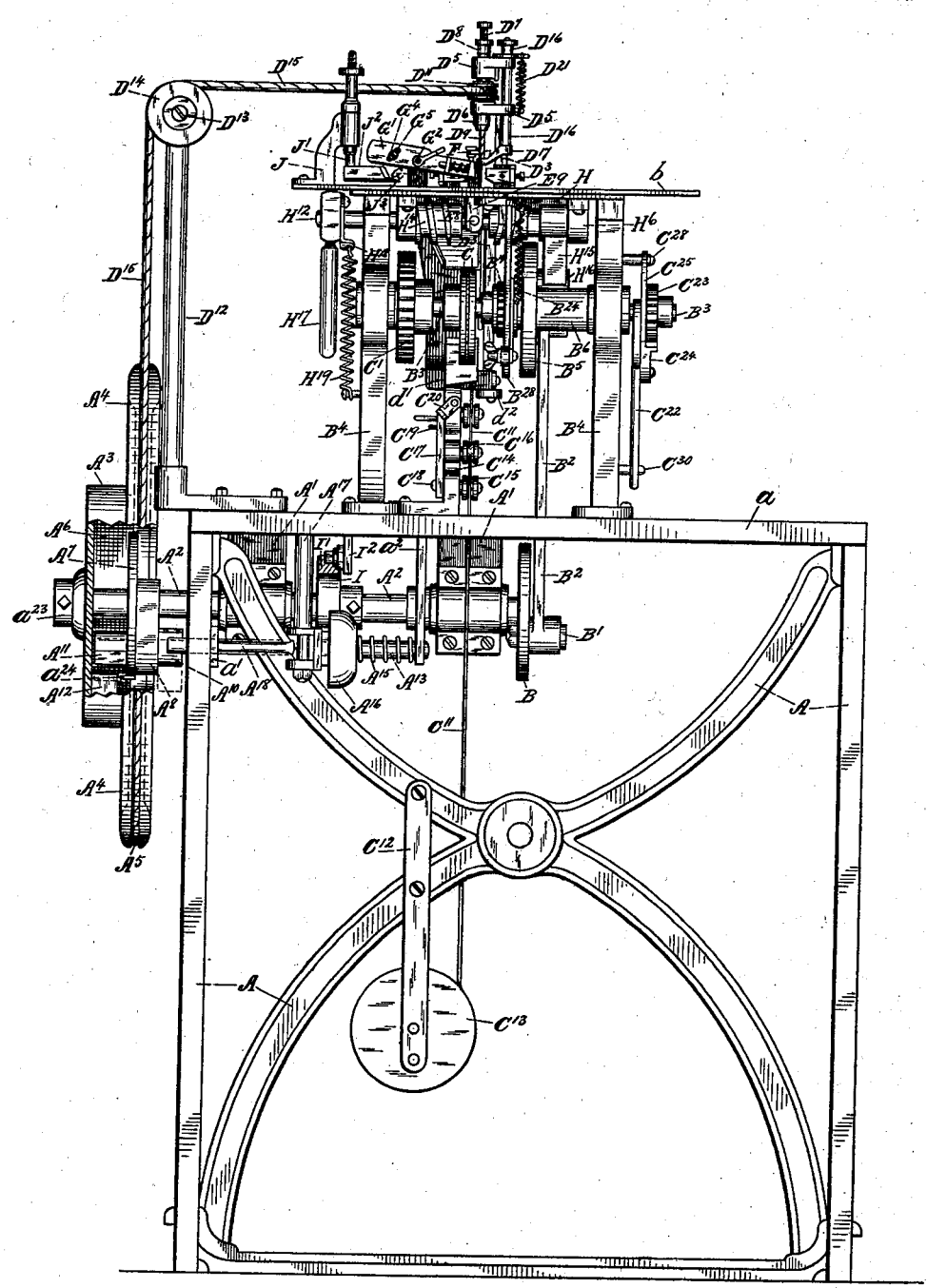

No. 708,636. Patented Sept. 9, 1902.
T. HAWTHORNE.
COMBINED PERFORATING, RING FORMING, AND INSERTING MACHINE.
(Application filed Nov. 25, 1898.)
(No Model.) 9 Sheets—Sheet 1.

Witnesses
S. McBain
L. Garner

Inventor
Thomas Hawthorne
By P. J. Edmunds
Attorney

No. 708,636. Patented Sept. 9, 1902.
T. HAWTHORNE.
COMBINED PERFORATING, RING FORMING, AND INSERTING MACHINE.
(Application filed Nov. 25, 1898.)
(No Model.) 9 Sheets—Sheet 3.
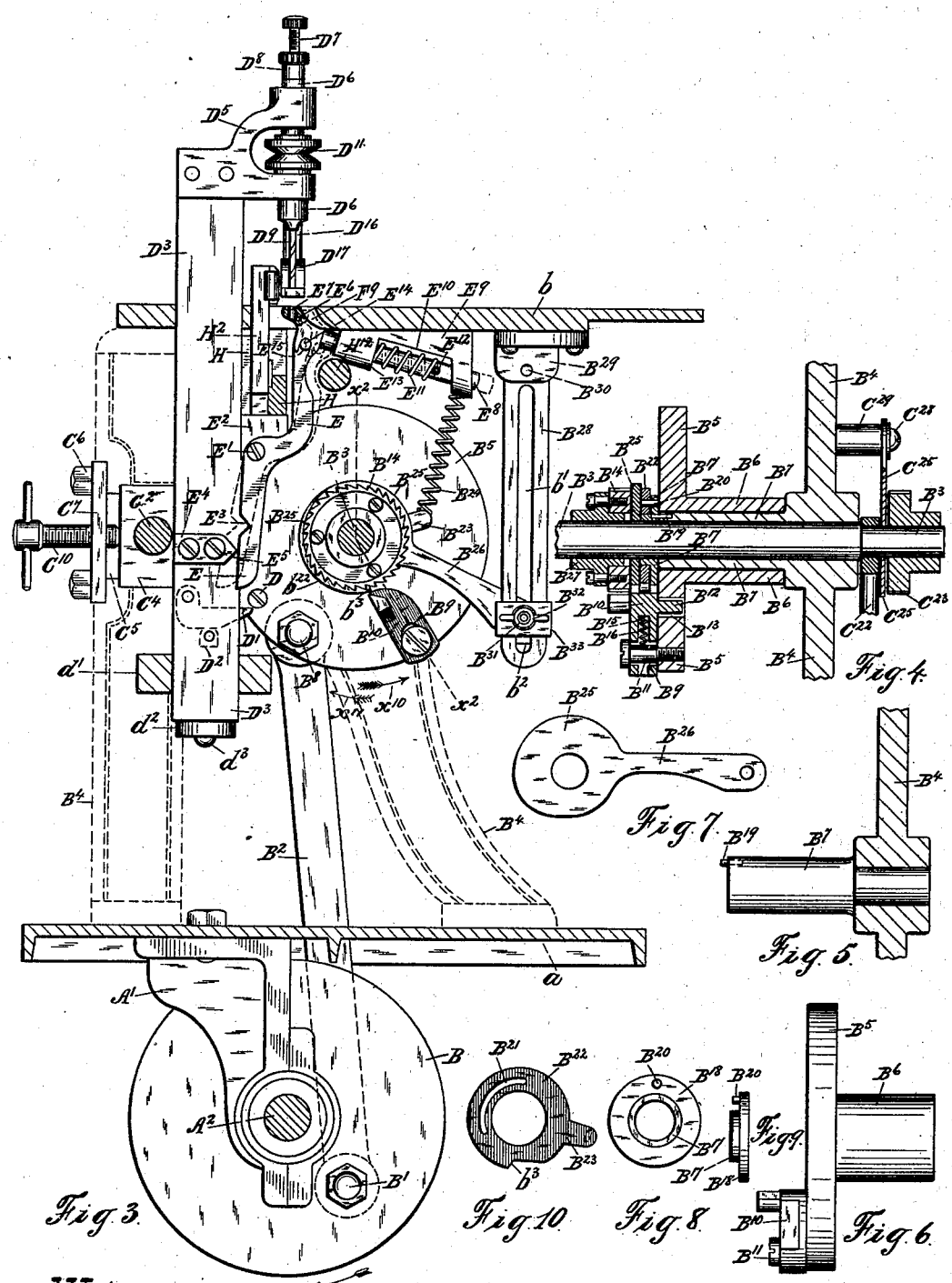
Witnesses
S. McBain
L. Garner
Inventor
Thomas Hawthorne
By P. J. Edmunds
Attorney No. 708,636. Patented Sept. 9, 1902.
T. HAWTHORNE.
COMBINED PERFORATING, RING FORMING, AND INSERTING MACHINE.
(Application filed Nov. 25, 1898.)
(No Model.) 9 Sheets—Sheet 4.

Witnesses
S. McBain
L. Garner

Inventor
Thomas Hawthorne
By P. J. Edmunds
Attorney

No. 708,636. Patented Sept. 9, 1902.
T. HAWTHORNE.
COMBINED PERFORATING, RING FORMING, AND INSERTING MACHINE.
(Application filed Nov. 25, 1898.)
(No Model.) 9 Sheets—Sheet 5.
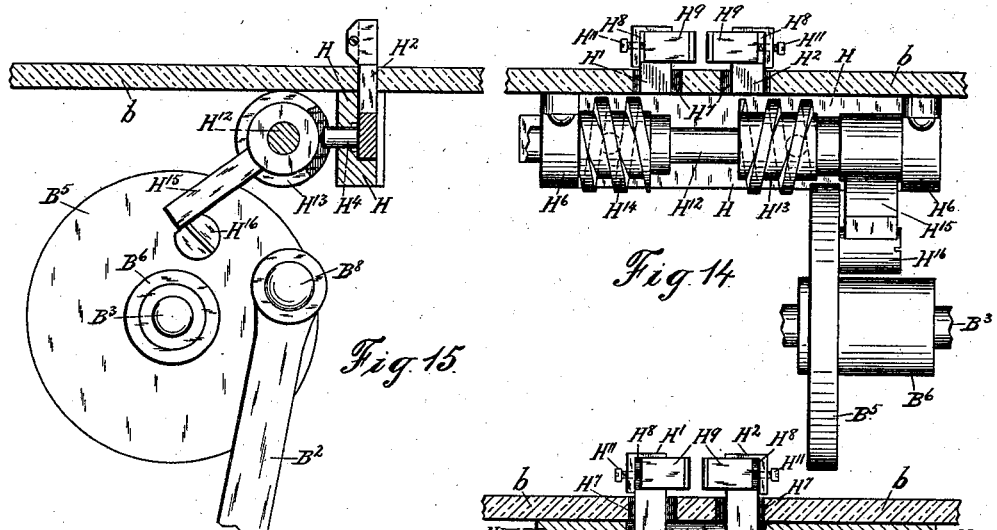
Fig. 14.
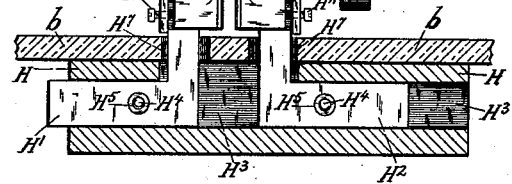
Fig. 15.
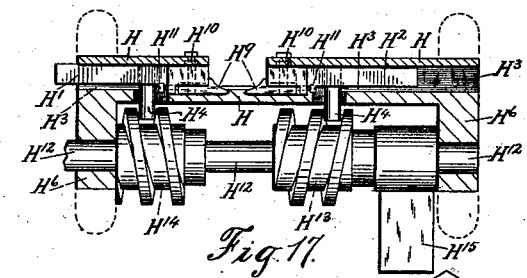
Fig. 16.
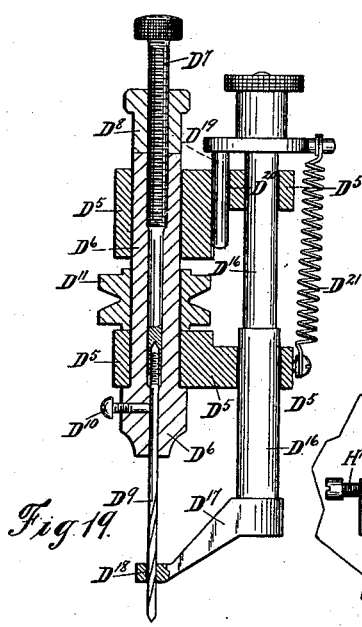
Fig. 19.
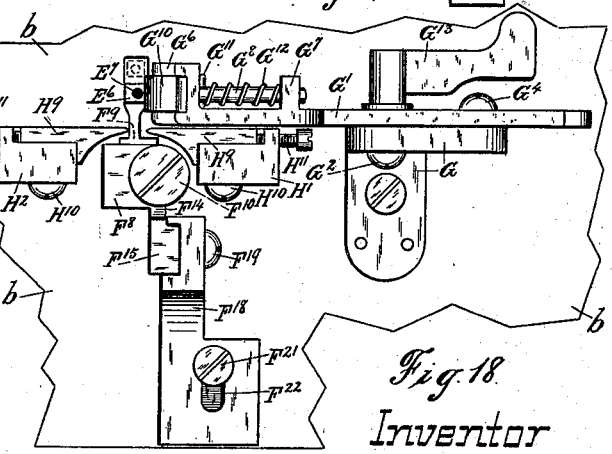
Fig. 17.
Fig. 18.
Witnesses
S. McBain
L. Garner
Inventor
Thomas Hawthorne
By P. J. Edmunds
Attorney

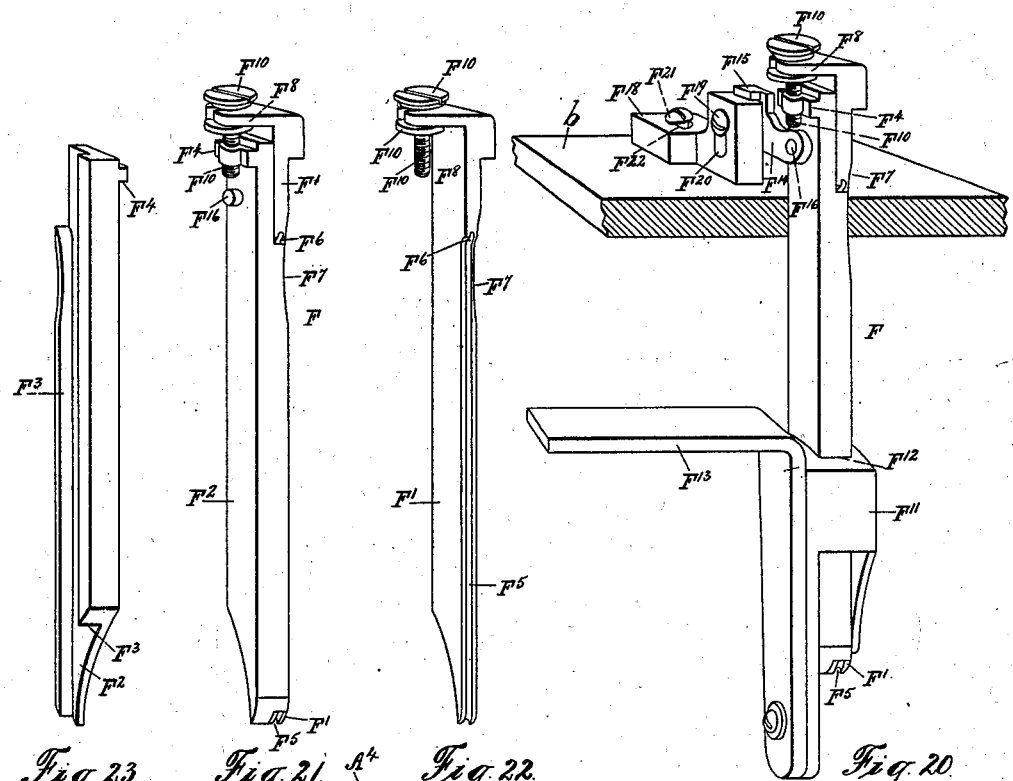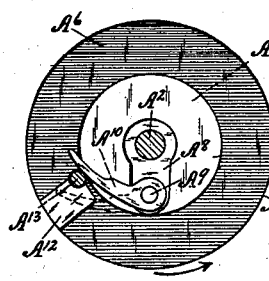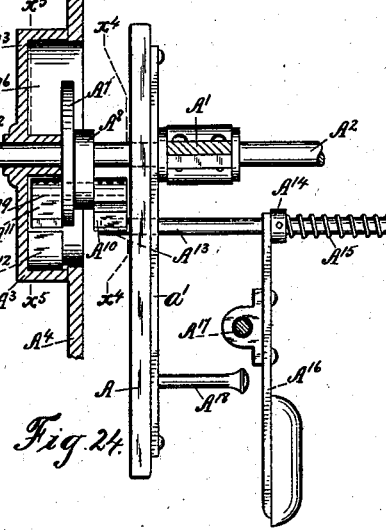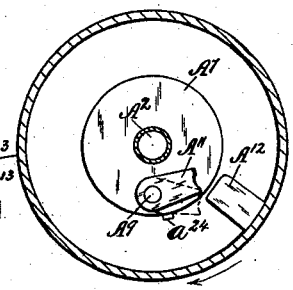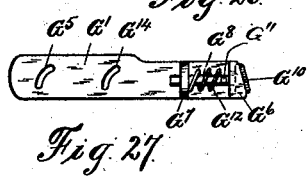

No. 708,636. Patented Sept. 9, 1902.
T. HAWTHORNE.
COMBINED PERFORATING, RING FORMING, AND INSERTING MACHINE.
(Application filed Nov. 25, 1898.)
(No Model.)
9 Sheets—Sheet 7.

Witnesses.
P. Edmunds
A. Edmunds

Inventor.
Thomas Hawthorne
By P. J. Edmunds
Attorney

No. 708,636. Patented Sept. 9, 1902.
T. HAWTHORNE.
COMBINED PERFORATING, RING FORMING, AND INSERTING MACHINE.
(Application filed Nov. 25, 1898.)
(No Model.) 9 Sheets—Sheet 8.
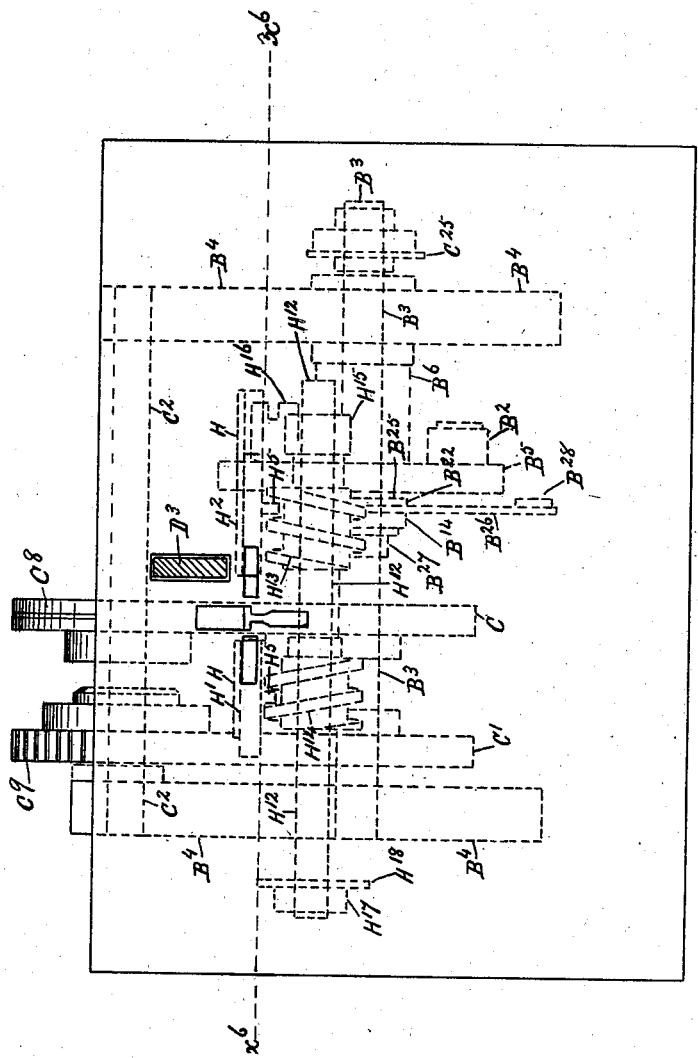
Witnesses
A. E. Edmunds
S. McBain
Inventor
Thomas Hawthorne
By P. J. Edmunds
Attorney No. 708,636. Patented Sept. 9, 1902.
T. HAWTHORNE.
COMBINED PERFORATING, RING FORMING, AND INSERTING MACHINE.
(Application filed Nov. 25, 1898.)
(No Model.) 9 Sheets—Sheet 9.
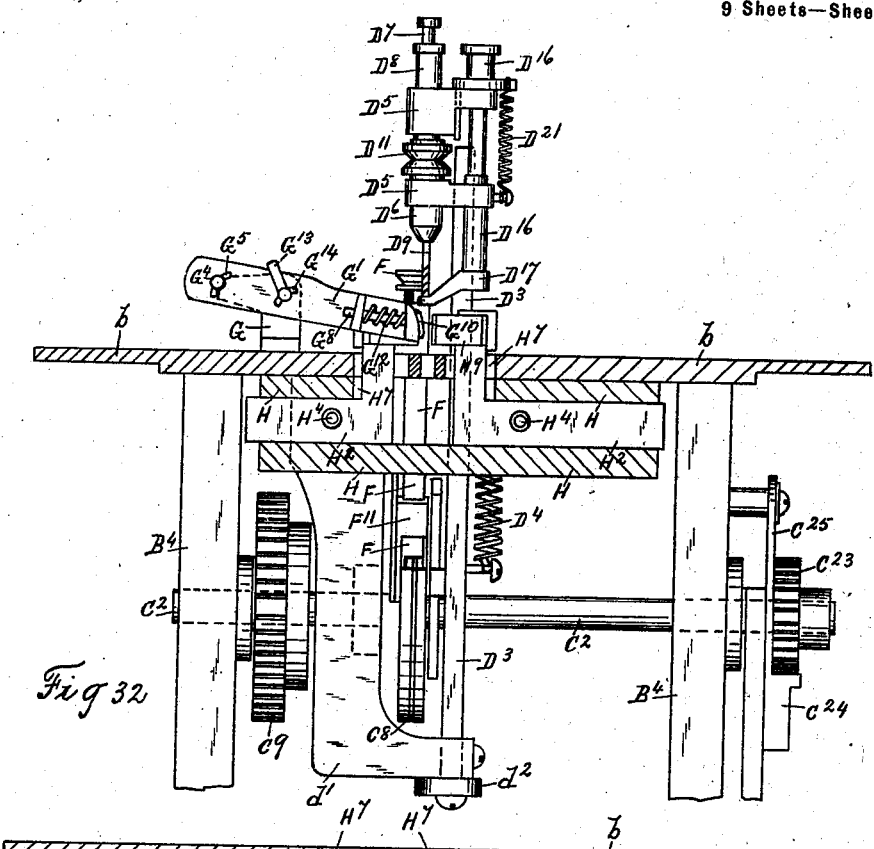
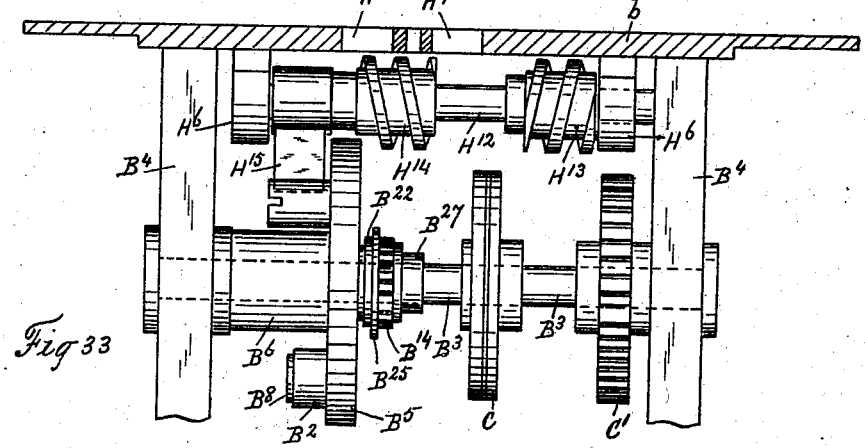
Witnesses
A. Edmunds
S. McBain
Inventor
Thomas Hawthorne
By P. J. Edmunds
Attorney ary,

UNITED STATES PATENT OFFICE.

THOMAS HAWTHORNE, OF LONDON, CANADA.

COMBINED PERFORATING, RING FORMING, AND INSERTING MACHINE.

SPECIFICATION forming part of Letters Patent No. 708,636, dated September 9, 1902.

Application filed November 25, 1898. Serial No. 697,479. (No model.)

*To all whom it may concern:*

Be it known that I, THOMAS HAWTHORNE, a subject of Her Majesty the Queen of Great Britain, and a resident of the city of London, in the county of Middlesex, in the Province of Ontario, Canada, have invented a certain new and useful Combined Perforating, Ring Forming, and Inserting Machine, of which the following is a specification.

The object of this invention is to provide a machine that will perforate sheets of printed matter or other articles and form and insert a wire ring or loop through the perforation therein for the purpose of suspension and at the same time accomplish this result rapidly and economically; and this invention consists of means for forming perforations in sheets of printed matter or other articles, together with means for operating and alternately throwing said perforating mechanism in and out of operation, and of adjustable means for forming rings or loops of different diameters and simultaneously with their formation inserting them in the perforations in the sheets of printed matter or other articles for the purpose of suspension, and of means for cutting off said ring or loop from the wire strand from which it is formed, and of means for intermittently feeding wire to form said rings or loops, and of means for causing the amount of wire presented to the wire-feeding mechanism to vary to accord with the diameter of the ring or loop required; and it also consists in the novel construction and combination of parts, as will be hereinafter fully described and claimed, reference being had to the accompanying drawings, wherein—

Figure 2:
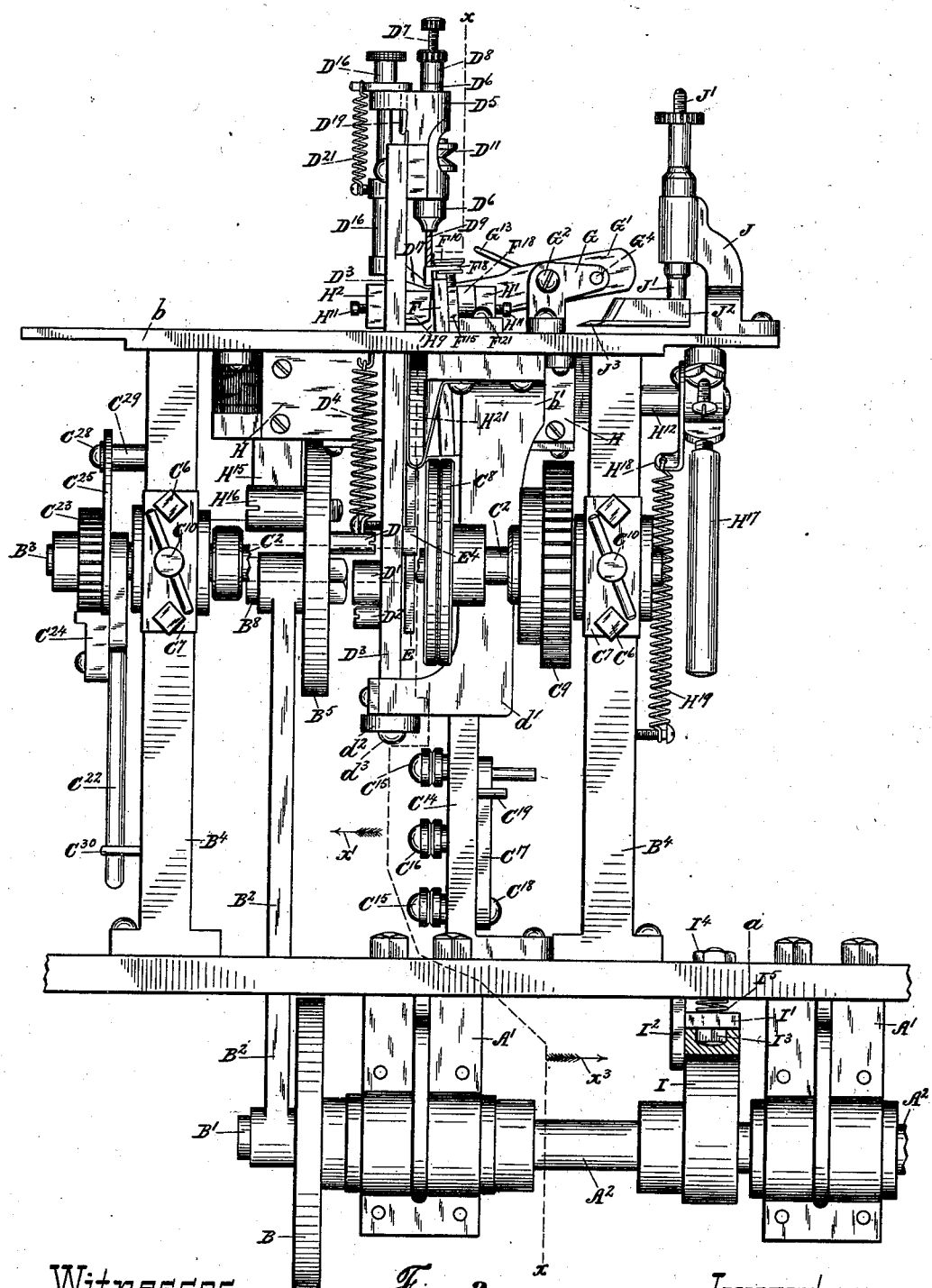
Figures 11, 12, 13:
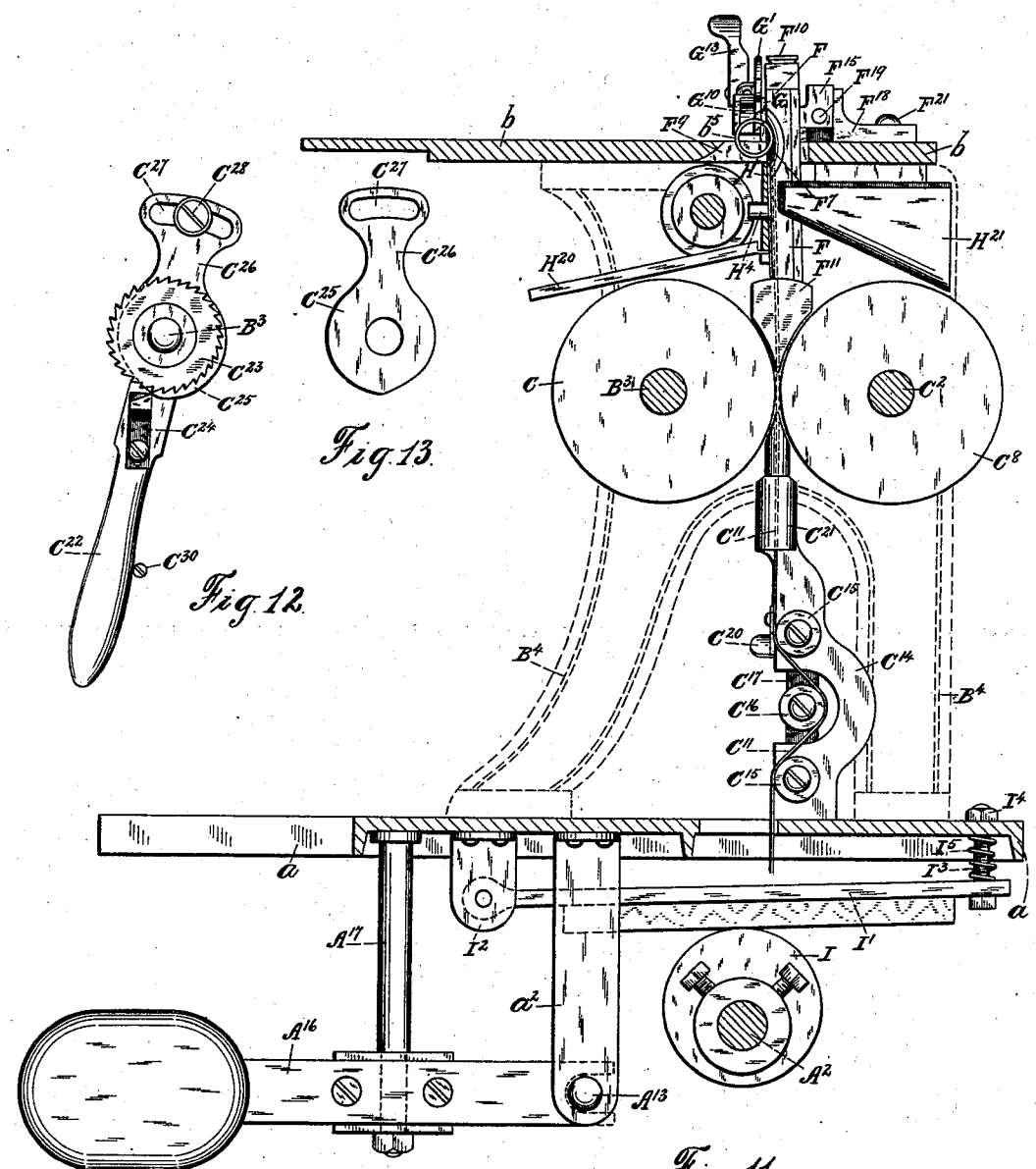
Figure 28:
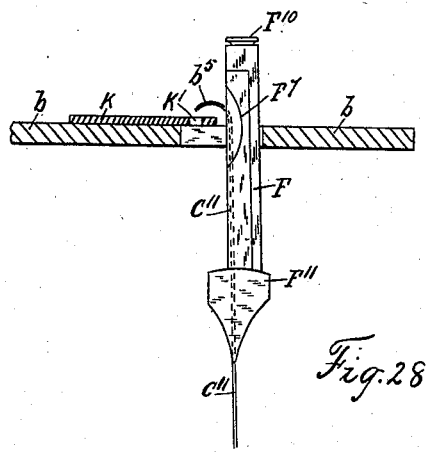
Figure 29:
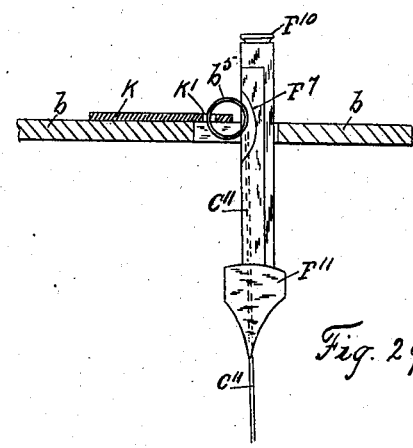
Figure 30:
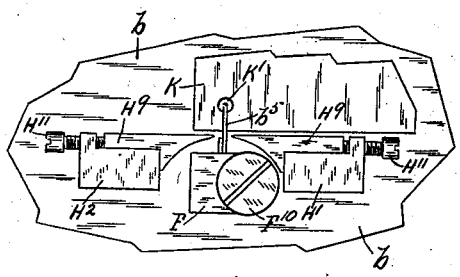

Figure 1 is a front view of a machine embodying my invention. Fig. 2 is an enlarged detail rear view of the upper portion of Fig. 1. In this view the shaft $C^2$ is partly cut away. Fig. 3 is a detail cross-sectional view of the machine on the line $x\ x$ of Fig. 2 looking in the direction of the arrow $x'$. In this view the chute $H^{21}$ is removed. Fig. 4 is a detail cross-sectional view on the line $x^2\ x^2$ of Fig. 3. Fig. 5 is a detail side view of the frame-sleeve of Fig. 4. In this view a portion of the frame is shown in section. Fig. 6 is a detail side view of the oscillating disk, disk-sleeve, and dog of Fig. 4. Fig. 7 is a detail side view of the arm-plate of Fig. 4. Figs. 8 and 9 are detail front and side views, respectively, of the flanged sleeve of Fig. 4. Fig. 10 is a detail side view of the slotted plate of Fig. 4. Fig. 11 is a detail cross-sectional view of the machine on the line $x\ x$ of Fig. 2 looking in the direction of the arrow $x^3$. In this view a side elevation of the chute $H^{21}$ is shown. Fig. 12 is a detail side view of the supplemental mechanism for operating the feeding-rollers by hand. Fig. 13 is a detail side view of the cam-plate of Fig. 12. Fig. 14 is an enlarged detail front view of the cutter-operating mechanism. Fig. 15 is an end view of same. Fig. 16 is a detail side view of the cutter-carrying slides and a portion of the slide-box. Fig. 17 is a detail plan view of Fig. 14. In this view the table through which the cutter-carrying slides project is removed. Fig. 18 is an enlarged detail plan view of the cutters, the ring-former and part of its adjusting mechanism, and the wire-guide. Fig. 19 is an enlarged detail side view, partly in section, of the head and perforating attachments. Fig. 20 is an enlarged detail perspective view of the ring-former and its adjusting and holding attachments. Fig. 21 is a detail perspective view of the ring-former. Figs. 22 and 23 are detail perspective views of the parts composing the ring-former separated. Fig. 24 is a detail plan view of the trip-lever and connections. Fig. 25 is a detail side elevation of the recessed portion of the loose pulley and parts contained therein on the line $x^4\ x^4$ of Fig. 24. In this view the central recess is shown slightly larger in cross-section. Fig. 26 is a detail sectional view on the line $x^5\ x^5$ of Fig. 24. Fig. 27 is a detail side view of the arm $G'$. Fig. 28 is a detail side elevation of the ring-former and its pivotal support and a partly-completed loop, together with a portion of the table and the perforated article thereon. Fig. 29 is another view of same, showing the completed loop and the latter extending through the perforation in the perforated article. Fig. 30 is a detail plan view showing the relative position of the ring-former, the ring or loop, and the cutters just before the loop or ring is severed from the wire strand. Fig. 31 is a horizontal section just above the plane of the table and showing in dotted lines the location of the principal elements of the various groups of mechanism located below the table. Fig. 32 is a vertical section through the upper portion of the machine in the plane of the perforator on the line $x^6$ $x^6$ of Fig. 31, showing the side of the sectional line looking toward the back of the machine. Fig. 33 is another sectional view showing the machine on the opposite side of said sectional line $x^6$ $x^6$ or looking toward the front of the machine.

In the accompanying drawings, A designates the frame of the machine; A' A', hangers depending from and rigidly secured to the under side of the top $a$ of said frame, in which hangers the shaft $A^2$ is supported and held in place and in which it revolves perfectly free, and a single-revolution clutch, constructed as follows, is mounted on said shaft $A^2$.

$A^3$ designates a loose pulley held on the shaft $A^2$ by the collar $a^{23}$, and $A^4$ designates a fly-wheel in which a groove $A^5$ is formed, and said fly-wheel is rigidly secured to the pulley $A^3$.

$A^6$ designates a central recess formed in one side of the pulley $A^3$ and fly-wheel $A^4$.

$A^7$ designates a disk provided with a reinforcing-rib $A^8$, which disk is rigidly secured to the shaft $A^2$, and $A^9$ designates a rock-shaft held in place, supported by, and revolving perfectly free in a socket formed in this disk $A^7$ and rib $A^8$, as shown in Figs. 24, 25, and 26, and to one end of said rock-shaft $A^9$ a trip-arm $A^{10}$ is rigidly secured, and to the other end a pawl $A^{11}$ is fixed, and secured to or formed with the interior of the pulley $A^3$ is a shoulder $A^{12}$, and the latter is so located that when the arm $A^{10}$ is tripped the pawl $A^{11}$ will swing downward in the path of and engage with said shoulder $A^{12}$.

$a^{24}$ designates a stud on the disk $A^7$, on which stud $a^{24}$ the pawl $A^{11}$ falls after the arm $A^{10}$ is tripped, and this stud $a^{24}$ is so located on the disk $A^7$ that when the pawl $A^{11}$ rests thereon said pawl will be in proper position to engage with the shoulder $A^{12}$.

$A^{13}$ designates a trip-bolt which is supported by and freely adjustable lengthwise in the brackets $a'$ and $a^2$, and $A^{14}$ designates a collar rigidly secured to said trip-bolt $A^{13}$, between which collar and the bracket $a^2$ a coil-spring $A^{15}$ is interposed.

$A^{16}$ designates a trip-lever pivotally secured to the pivot-bolt $A^{17}$, and the inner end of this lever is forked and clasps the trip-bolt $A^{13}$ and engages with the collar $A^{14}$, and said brackets $a'$ and $a^2$ and pivot-bolt $A^{17}$ are rigidly secured to the frame A of the machine or other convenient support.

$A^{18}$ designates a stop against which the trip-lever $A^{16}$ abuts just after the trip-arm $A^{10}$ is released from the trip-bolt $A^{13}$ for the purpose of preventing excessive movement of said trip-lever $A^{16}$.

B designates a disk rigidly secured to the shaft $A^2$; B', a stud or pin rigidly secured to said disk B at any suitable distance from the center, and $B^2$ a pitman the lower end of which is pivotally secured and held in place on said stud B'.

$B^3$ designates a shaft (shown in Figs. 1, 3, and 4) which is supported by, held in place, and revolves perfectly free in bearings in the supplemental frame $B^4$, and on this shaft the wire-feed mechanism, constructed as follows, is supported.

$B^5$ designates an oscillating disk formed with a sleeve $B^6$, and said disk and sleeve are supported by, held in place, and revolve perfectly on a frame-sleeve $B^7$, which forms part of or is rigidly secured to the supplemental frame $B^4$, as shown in Fig. 4.

$B^8$ designates a stud or pin (shown in Fig. 2) secured to the disk $B^5$ at any suitable distance from the center, and the upper end of the pitman $B^2$ is pivotally secured to and held in place on said stud $B^8$.

$B^9$ designates an elongated slot or opening formed in the dog $B^{10}$, through which slot $B^9$ the stud or pin $B^{11}$ extends, and the latter is rigidly secured to the disk $B^5$, and the dog $B^{10}$ is held in place between the disk $B^5$ and the enlarged head of the stud $B^{11}$, as shown in Fig. 4.

$B^{12}$ designates an arm formed with or secured to the dog $B^{10}$, which arm extends into an elongated slot $B^{13}$, formed in the disk $B^5$. This arm $B^{12}$ is for the purpose of guiding and holding the dog $B^{10}$ in line as it is adjusted to or from the ratchet-wheel $B^{14}$.

$B^{15}$ designates a spring which is held in place in a socket $B^{16}$, formed in the dog $B^{10}$, which socket $B^{16}$ opens into the slot $B^9$, and said spring $B^{15}$ is held in place between the end of said socket $B^{16}$ and the stud or pin $B^{11}$ to automatically move said dog $B^{10}$ toward, hold it in engagement with, or permit it to be disengaged from the ratchet-wheel $B^{14}$.

$B^{17}$ designates a sleeve provided with a flange $B^{18}$, and $B^{19}$ a pin which holds said flanged sleeve $B^{17}$ in engagement with the frame-sleeve $B^7$.

$B^{20}$ designates a pin which is rigidly secured to the flanged sleeve $B^{17}$, and said pin is fitted to an elongated slot $B^{21}$ in the slotted plate $B^{22}$, and the latter is supported by and rotates freely on the flanged sleeve $B^{17}$.

$B^{23}$ designates a lug on the slotted plate $B^{22}$, and $B^{24}$ a spring which extends from and connects said lug $B^{23}$ with the top $b$ of the supplemental frame $B^4$ or other suitable support.

$B^{25}$ designates a cam provided with an arm $B^{26}$, and the flanged sleeve $B^{17}$ and said cam $B^{25}$ are mounted on the shaft $B^3$, the latter extending through openings in the former and revolving freely in said openings.

$B^{27}$ designates a collar which is rigidly secured to the shaft $B^3$, and to said collar $B^{27}$ the ratchet-wheel $B^{14}$ is rigidly secured.

$B^{28}$ designates a bar formed with a slot $b'$, and the upper end of said slotted bar $B^{28}$ is pivotally secured to a bracket $B^{29}$ by the pivot-pin $B^{30}$, and said bracket $B^{29}$ is rigidly secured to the under side of the top $b$ of the supplemental frame $B^4$.

$B^{31}$ designates a bolt which is fitted to and extends through a bolt-hole in the arm $B^{26}$ of the cam $B^{25}$ and through a slot in a square block $b^2$, fitted to and sliding freely in the slot $b'$ of the slotted bar $B^{28}$, and $B^{32}$ designates a winged nut. Between the latter and the head of the bolt $B^{31}$ the arm $B^{26}$ and slotted bar $B^{28}$ are interposed, and they are held together by turning the winged nut $B^{32}$ on the bolt $B^{31}$.

$B^{33}$ designates a washer which clasps the slotted bar $B^{28}$ to prevent the bolt $B^{31}$ from falling out of the slot $b'$, and a portion of the eccentric periphery of the cam $B^{25}$ has a greater radius than the ratchet-wheel $B^{14}$, and the pawl or dog $B^{10}$ is forced out of contact with the teeth of said ratchet-wheel at a point where the periphery of said cam crosses the periphery of said ratchet-wheel, and the adjustment of the arm $B^{26}$ of the cam $B^{25}$ on the bar $B^{28}$ varies this point.

C designates a grooved feed-wheel, and $C'$ a toothed wheel, rigidly secured to the shaft $B^3$.

$C^2$ designates a shaft which is supported by and held in place and revolves perfectly free in the adjustable boxes $C^4$, and the latter are supported by and held in place in recesses $C^5$ in the frame $B^4$ by the plate $C^7$, and the latter is secured to the supplemental frame $B^4$ on opposite sides of the recesses $C^5$ by screw-bolts $C^6$.

$C^8$ designates a grooved feed-wheel, and $C^9$ a toothed wheel which is rigidly secured to the shaft $C^2$ and located thereon to come opposite to the grooved feed-wheel C and toothed wheel $C'$, respectively, on the shaft $B^3$, and the meshing of the teeth of the toothed wheels $C'$ and $C^9$ communicates motion to the shaft $C^2$.

$C^{10}$ designates set-screws which extend through screw-threaded sockets in the plates $C^7$ and engage with the boxes $C^4$ for the purpose of adjusting the latter, as well as the shaft $C^2$ and grooved feed-wheel $C^8$, toward the grooved feed-wheel C for the purpose of regulating the tension of said grooved feed-wheels on the wire $C^{11}$, passing between them.

$C^{12}$ designates a spool-holder secured to the frame A, and to said spool-holder a spool $C^{13}$ is secured, which carries the wire from which the rings are to be formed.

$C^{14}$ designates a standard rigidly secured to the top $a$ of the frame, and $C^{15}$ represents grooved wire-straightening rollers which are supported by, held in place, and revolve perfectly free on studs or pins secured to said standard $C^{14}$.

$C^{16}$ designates a grooved wire-straightening roller which is supported by, held in place, and revolves perfectly free on a stud or pin secured to the arm $C^{17}$, pivotally secured to the standard $C^{14}$ by the pivot-pin $C^{18}$, and said arm when properly adjusted is held in place between the stop $C^{19}$ on the standard $C^{14}$ and the button $C^{20}$, pivotally secured to said standard $C^{14}$. The object of securing the roller $C^{16}$ to the adjustable pivotal arm $C^{17}$ is to facilitate the insertion of the wire between the straightening-rollers $C^{15}$ and $C^{16}$, as shown in Fig. 11.

$C^{21}$ designates a tubular guide which is formed with or secured to the standard $C^{14}$, through which guide the wire $C^{11}$ passes, the object of said guide $C^{21}$ being to direct the wire $C^{11}$ properly to the feed-wheels C and $C^8$.

$C^{22}$ designates a hand-lever pivotally secured to, and $C^{23}$ a ratchet-wheel rigidly secured to, the shaft $B^3$, and $C^{24}$ designates a dog provided with a spring and arm and constructed and operating to and from the ratchet-wheel $C^{23}$ identically the same as the dog $B^{11}$, hereinbefore fully described, operates to and from the ratchet-wheel $B^{14}$, the dog $C^{24}$ being held against the lever $C^{22}$, in which a slot is formed, the same as the dog $B^{10}$ is held against the disk $B^5$, in which the slot $B^{13}$ is formed.

$C^{25}$ designates a cam-plate provided with an arm $C^{26}$, and in said arm a slot $C^{27}$ is formed, and $C^{28}$ designates a screw-bolt which extends through the elongated slot $C^{27}$ and its inner end screwed or otherwise secured in the side of the supplemental frame. The outer end of the arm $C^{26}$ of the cam $C^{25}$ is rigidly held in place by being interposed between the head of the screw-bolt $C^{28}$ and a sleeve $C^{29}$, the latter encircling said screw-bolt between the arm $C^{26}$ and the frame $B^4$, the whole being rigidly secured together by turning said screw-bolt $C^{28}$ into a screw-threaded socket in the frame $B^4$.

$C^{30}$ designates a stop formed on the supplemental frame $B^4$ to prevent excessive movement of the lever $C^{22}$, and a portion of the eccentric periphery of the cam $C^{25}$ has a greater radius than the ratchet-wheel $C^{23}$, and the pawl or dog $C^{24}$ is forced out of contact with and held clear of the teeth of said ratchet-wheel at a point where the periphery of said cam-plate crosses the periphery of said ratchet-wheel, and the adjustment of the upper end of the lever $C^{22}$ on the pin $C^{28}$ varies this point.

The perforating mechanism is constructed as follows:

D designates a wiper (shown in Fig. 2) rigidly secured to the disk $B^5$; $D'$, a toe pivotally supported on and $D^2$ a stop rigidly secured to the sliding bar $D^3$, the object of the stop $D^2$ being to hold the pivoted toe $D'$ from moving away from the wiper D while the sliding bar $D^3$ is being adjusted the required distance in a downward direction, and said sliding bar $D^3$ is guided and held in line as it moves vertically by extending through openings in the table $b$ and bracket $d'$, secured to said table, and a washer $d^2$, secured to the lower end of the sliding bar $D^3$ by the screw-bolt $d^3$, prevents said sliding bar from being lifted out of the bracket $d'$ by the spring $D^4$.

$D^4$ designates a spring (shown in Fig. 2) one end of which is secured to the sliding bar $D^3$ and the other end to the top $b$ of the frame B¹. As the wiper D moves the sliding bar D³ downward the spring D⁴ is extended, so that the instant that the wiper D disengages from the pivoted toe D' the spring D⁴ will contract and instantly raise the sliding bar D³ to its upper normal position, and to permit the wiper D to return to its normal position the toe D' is constructed to move pivotally in an upward direction to permit said wiper D to pass said toe D'.

D⁵ designates a head (shown in Figs. 1, 2, and 19) rigidly secured to the upper end of the sliding bar D³, and D⁶ a spindle supported by, held in place, and revolving perfectly free in said head D⁵.

D⁷ designates an adjusting-screw which is screwed into a screw-threaded socket in the spindle D⁶, and D⁸ a set-nut adjustable on the screw D⁷, by tightening which set-nut on the end of the spindle D⁶ said screw D⁷ is rigidly secured to and held at the position to which it may be adjusted in the spindle D⁶.

D⁹ designates a drill screwed or otherwise rigidly secured in the lower end of the screw D⁷, and said drill D⁹ is further rigidly held and secured in position by the set-screw D¹⁰, extending through a screw-threaded socket in the spindle D⁶ and abutting against the drill D⁹, as shown in Fig. 19.

D¹¹ designates a grooved pulley which is rigidly secured to the spindle D⁶.

D¹² designates a bracket (shown in Fig. 1) secured to the table b, and to the upper end of said bracket D¹² an axle D¹³ is secured, on which two grooved pulleys D¹⁴ are supported and held in place and on which they revolve perfectly free.

D¹⁵ designates a belt which rests in the grooves of and passes over the fly-wheel A⁴, pulley D¹⁴, pulley D¹¹, and back over another pulley corresponding to and side by side with the pulley D¹⁴, and back to the fly-wheel, by means of which belt and pulleys motion is communicated from the shaft A² to the spindle D⁶, and the drill D⁹ being secured to said spindle said drill is also rotated.

D¹⁶ designates a standard provided with a foot D¹⁷, in which a circular aperture D¹⁸ is formed, in which aperture the lower end of the drill D⁹ rests, and said standard moves vertically in the head D⁵ and is guided and held in line and all rotation is avoided and completely prevented by the guide D¹⁹, secured to said standard and held in place in a socket D²⁰ in said head D, all as shown in Fig. 19.

D²¹ designates a compression-spring one end of which is secured to said standard D¹⁶ and the other end to the head D⁵.

As the head D⁵ is lowered the drill D⁹ will also be lowered correspondingly or sufficient to project its point below the face of the table b, and consequently through the printed matter or other object K, properly placed on said top or table b to be perforated; but the standard D¹⁶, to which the foot D¹⁷ is secured, being movable vertically in the head D⁵ as the latter is lowered the foot D¹⁷ will also be lowered until it abuts against and rests on the printed matter around said drill, and as the drill is further lowered the standard D¹⁶ will move vertically up through the head D⁵ and extend the compression-spring D²¹. This will compress said foot on said printed matter or other object K and firmly hold it while the perforation K' is being formed therein and until the drill is withdrawn therefrom; and the instant that the wiper D disengages from the toe D' the spring D⁴ will contract and raise the sliding bar D³, together with the head D⁵ and standard D¹⁶, and this again permits the spring D²¹ to contract and lower the standard D¹⁶ in the head D⁵. If preferred, however, a punch may be used in lieu of and secured in place similar to said drill D⁹. By using a punch the grooved pulleys D¹¹ and D¹⁴, belt D¹⁵, and bracket D¹² could be dispensed with.

E designates a lever (shown particularly in Fig. 3) which is pivotally secured by the pivot-pin E' to the bracket E², (shown in Fig. 3,) and said bracket is secured to the top or table b of the frame B⁴ or other suitable support in any manner or by any means found most suitable or convenient. E³ designates a notch formed in said lever E, and E⁴ a wiper formed with the angular end E⁵, which wiper is rigidly secured to the sliding bar D³; and the angular end E⁵ of said wiper E⁴ is so located on the sliding bar D³ and fitted to the notch E³ that as the sliding bar D³ moves vertically the angular end E⁵ of said wiper E⁴ is moved alternately in the notch E³ and on the face of said lever E.

E⁶ designates a movable work-support in which the opening E⁷ is formed to receive the lower end of the drill D⁹, and the latter is fitted to said opening D⁷; and the shank E⁸ of said support E⁶ is supported by and held in place and moves back and forth perfectly free in the bearing E⁹, secured to the under side of the top or table b, and said movable work-support E⁶ is held in said bearing E⁹ at an angle to or diagonally to the top or table b, so that as said movable work-support E⁶ is moved in said bearing E⁹ it moves diagonally to and from said top or table b. E¹⁰ designates a recess formed in said bearing E⁹, and encircling the shank E⁸ in said recess E¹⁰ is a spring E¹¹; and E¹² designates a pin secured to and the ends of which project beyond the shank E⁸ and form an abutment for one end of the spring E¹¹, the other end of said spring abutting against a shoulder E¹³ on the bearing E⁹; and the notched lever E is pivotally secured to the movable work-support E⁶ by pivot-studs E¹⁴ on said lever E engaging with a socket or recess E¹⁵ in said support E⁶.

F designates a ring-former which extends through an opening F⁹ in the top or table b, and said ring-former is composed of the inner section F' and the outer F², as shown in Figs. 21, 22, and 23.

$F^3$ $F^3$ designate longitudinal flanges, and $F^4$ a cross-flange, with which the outer section $F^2$ is provided, and in said cross-flange $F^4$ a screw-threaded socket is formed, and between the longitudinal flanges $F^3$ the inner section $F'$ is held in place.

$F^5$ designates an elongated groove formed in the inner section $F'$, and said groove $F^5$ is curved outward at the upper end, as shown at $F^6$, and $F^7$ designates a recess formed in one side of the ring-former F for the purpose which will be hereinafter set forth.

$F^8$ designates a forked overhanging head with which the section $F'$ is provided.

$F^{10}$ designates a double-headed adjusting-screw the shank of which between the heads is formed plain and fitted to and inserted between the prongs of the forked overhanging head $F^8$, so that one of the heads of said screw $F^{10}$ will be above and the other below the overhanging head $F^8$. The result is that when the screw-threaded portion of the shank of the screw $F^{10}$ engages with and is operated in the screw-threaded socket in the flange $F^4$ the inner section $F'$ will be adjusted longitudinally on the outer section $F^2$.

$F^{11}$ designates a pivotal support in which a socket $F^{12}$ is formed, and in said socket $F^{12}$ the lower end of the ring-former F is held; and said support $F^{11}$ is pivotally secured to the bracket $F^{13}$ and in line with the center of the feed-rollers C and $C^3$; and said bracket $F^{13}$ is rigidly secured to the bottom of the slide-box H and the latter to the table $b$.

$F^{14}$ designates an arm extending from the vertically-adjustable slide $F^{15}$, which arm is pivotally secured to and held in place on the stud $F^{16}$, and the latter is secured to or formed with the outer section $F^2$ of the ring-former F.

$F^{19}$ designates a set-screw (shown particularly in Fig. 20) which extends through an elongated slot $F^{20}$ in the horizontally-adjustable slide $F^{18}$ and into a screw-threaded socket in the slide $F^{15}$ for the purpose of holding the latter at the position to which it may be adjusted vertically on said slide $F^{18}$.

$F^{21}$ designates a set-screw which extends through an elongated slot $F^{22}$ in the horizontal slide $F^{18}$ and into a screw-threaded socket in the top or table $b$ for the purpose of holding said slide $F^{18}$ at the position to which it may be adjusted horizontally on said top or table $b$.

The device for holding the printed matter or other article firmly on the table while inserting and withdrawing the perforator and while inserting the ring or loop therein is constructed as follows:

G designates a bracket secured to the top or table $b$, and $G^2$ a pin which extends through a pin-hole in said bracket G and through an elongated slot $G^{14}$ in the arm $G'$.

$G^4$ designates a pin one end of which is rigidly secured in the bracket G and its other end rests in an elongated slot or opening $G^5$ in the arm $G'$. $G^6$ and $G^7$ designate lateral flanges formed on said arm $G'$, and supported by and held in place in sockets in said flanges is the shank $G^8$ of the inclined wire-guide $G^{10}$.

$G^{11}$ designates a pin secured in the shank $G^8$, and between the projecting ends of said pin $G^{11}$ and the flange $G^7$ a spring $G^{12}$ is interposed, and said spring encircles the shank $G^8$, as shown particularly in Fig. 18.

$G^{13}$ designates a winged nut which is fitted to and engages with the screw-threaded shank of the pin $G^2$ for the purpose of binding and holding the arm $G'$ at the position to which it may be adjusted vertically on the bracket G.

The mechanism for cutting the ring or loop from the wire is constructed as follows:

H designates a slide-box rigidly secured to the under side of the top or table $b$, and $H'$ $H^2$ designate L-shaped cutter-slides which are movable back and forth to and from one another in recesses $H^3$ in said slide-box H. (Shown in Figs. 14, 15, 16, and 17.) $H^4$ designates a stud or pin formed with or rigidly secured to the horizontal member of each of said cutter-slides $H'$ $H^2$, and $H^5$ is an antifriction-sleeve encircling each of said studs $H^4$, and the vertical member of each of said L-shaped cutter-slides $H'$ and $H^2$ extends through elongated slots or openings $H^7$ in the top or table $b$ and projects a short distance above said table $b$. $H^8$ designates sockets, one of which is formed in the upper portion of each of the vertical members of said slides $H'$ and $H^2$, and $H^9$ designates cutters which are secured in said sockets $H^8$ by the screws $H^{10}$.

$H^{11}$ designates adjusting-screws one of which extends through the end portion of each of the vertical members of the cutter-slides $H'$ and $H^2$ and engages with the cutter $H^9$ for the purpose of adjusting the latter to set them to cut the wire or to take up subsequent wear, and to accomplish this result it is necessary to form the screw-holes in the cutter-guides, through which the screws $H^{10}$ extend, slightly elongated.

$H^{12}$ designates a rock-shaft held in place, supported by, and revolving perfectly free in supplemental bearings $H^6$, secured to the table $b$, and $H^{13}$ and $H^{14}$ designate right and left worms or cams formed with or rigidly secured to the shaft $H^{12}$, and said worms or cams are so constructed and located on the shaft $H^{12}$ that they engage with the studs or pins $H^4$ to operate the slides $H'$ and $H^2$.

$H^{15}$ designates a toe rigidly secured to the rock-shaft $H^{12}$, and $H^{16}$ is a wiper rigidly secured to the disk $B^5$, and said wiper is so located on said shaft $H^{12}$ that as the disk $B^5$ is operated the wiper $H^{16}$ will engage with and adjust the toe $H^{15}$ as well as the shaft $H^{12}$ and worms $H^{13}$ and $H^{14}$ to cause the slides $H'$ and $H^2$ and cutters $H^9$, secured thereto, to move together to cut off the ring when formed.

$H^{17}$ designates a hand-lever rigidly secured to the rock-shaft $H^{12}$, by which the latter may be operated by hand-power, and $H^{18}$ designates an arm secured to said lever $H^{17}$, and $H^{19}$ is a spring one end of which is secured to the arm H¹⁸ and the other end to the frame B⁴. When the hand-lever H¹⁷ or toe H¹⁵ operates said rock-shaft H¹², the spring H¹⁹ is extended so that the instant the pressure is removed from the lever H¹⁷ or toe H¹⁵ said spring H¹⁹ will contract and return the lever H¹⁷, toe H¹⁵, shaft H¹², slides H′ and H², and cutters H⁹ to their normal position, and when in their normal position the slides H′ and H² and cutters H⁹ will be separated.

H²⁰ and H²¹ designate chutes (shown in Fig. 11) which carry off any refuse wire or refuse caused by forming the perforation in the article to prevent it from falling in the working parts of the machine, and thus avoid and completely prevent this refuse from interfering with the operation of the machine.

The friction-brake to stop the machine at a given point is constructed as follows:

I designates an eccentric rigidly secured to the shaft A², which eccentric engages with a spring-bar I′, and one end of the latter is pivotally secured to a bracket I², secured to the under side of the table $a$, as shown in Fig. 11, and through the other end of said bar a bolt I³ extends, and said bolt also extends through the table $a$ and is provided with a head and with a nut I⁴ to prevent it from falling out of said table $a$ and bar I′, and I⁵ is a coil-spring interposed between the table $a$ and spring-bar I′ and encircling the bolt I³ for the purpose of holding the bar I′ on the eccentric I, and said eccentric I is so arranged on the shaft A² that its longest radius will come opposite the spring-bar I′, and thus act as a brake to stop the machine at a given point, or just after the operation of perforating, forming, inserting, and cutting off the ring is completed and just before the arm A¹⁰ is tripped.

The operation is as follows: Motion is communicated to this machine by a belt (not shown) from a counter-shaft or other motive power passing over the loose pulley A³, and from the latter motion is communicated to the shaft A² by tripping the bolt A¹³, said bolt being tripped by the operator moving the outer end of the trip-lever A¹⁶ toward and in contact with the stop A¹⁸. This operation moves the trip-bolt A¹³ from under the trip-arm A¹⁰ and compresses the spring A¹⁵ between the collar A¹⁴ and the bracket $a^2$. When the trip-bolt A¹³ is moved from under the trip-arm A¹⁰, the outer end of the latter, as well as the outer end of the pawl A¹¹, will swing downward until the outer end of said pawl rests on the stud $a^{24}$, and when in this position the outer end of said pawl A¹¹ will be in the path of and in position to be engaged by the shoulder A¹² as the pulley A³ rotates. As the pulley A³ rotates the shoulder A¹² engages with the pawl A¹¹ and carries the latter, as well as the trip-arm A¹⁰, around with it. This rotates the shaft A², connected therewith, as well as the eccentric I and disk B, connected with said shaft A², and said shaft A² is rotated until the trip-arm A¹⁰ makes about one revolution, or until the under side of said trip-arm engages with the trip-bolt A¹³, the latter having been returned to its normal position by the expansion of the spring A¹⁵ after the pressure is removed from the trip-lever A¹⁶. As the under side of the trip-arm A¹⁰ engages with the end of the trip-bolt A¹³ said trip-arm, as well as the pawl A¹¹, connected therewith, is held at this point, and as the pulley A³ further rotates the shoulder A¹² disengages from the pawl A¹¹, which throws the machine out of gear, and to instantly stop the machine at this point the eccentric I is so timed that just at this moment its longest radius comes opposite the spring-bar I′, which acts as a brake to stop the machine at a given point, or instantly after the operation of forming, inserting, and cutting off the ring is completed. The printed matter or other object to be perforated is placed on the table $b$ in such a position that the point at which the perforation is required will be directly under the drill D⁹, and, as preferred, said perforation may be formed through the whole or a portion of the printed matter. After the printed matter or other object to be perforated is properly placed on the table $b$ the bolt A¹³ is tripped and the shaft A² and disk B operated, as before described, and the disk B being connected to the oscillating disk B⁵ by the pitman B² and said disk B⁵ being loosely mounted on the frame-sleeve B⁷ said disk B⁵ is operated with a reciprocating circular motion on and independent of said frame-sleeve B⁷, as will be hereinafter described. As the pitman B² moves downward the disk B⁵ will move in the direction of the arrow $x^{10}$, (shown in Fig. 3,) and as said disk B⁵ moves in said direction the wiper D will move in the same circular direction and engage with the pivoted toe D′ and move the latter, as well as the sliding bar D³ and head D⁵, in a downward direction. This will extend the spring D⁴ and lower the drill D⁹ and cause it to pass through the printed matter or other object placed in proper position under it on the table $b$, and said wiper D is so located on the disk B⁵ that the instant the perforation is formed said wiper D will move off the end of the pivoted toe D′. This will permit the spring D⁴ to instantly raise the sliding bar D³ and attachments to their normal position, and while the drill D⁹ is being lowered with the head D⁵ the foot D¹⁷ will also be lowered and simultaneously with the point of the drill D⁹ until said foot D¹⁷ rests on the printed matter or other article and around said drill, and as the head D⁵ is further lowered to cause the drill to pass through the printed matter or other article the compression-spring D²¹ will extend and firmly hold said foot D¹⁷ on and automatically adapt it to the thickness of said printed matter while the perforation is being formed therein and while withdrawing the drill therefrom, and as the standard D¹⁶ is lowered the outer end of the foot D¹⁷ abuts against and automatically moves backward the wire-guide G¹⁰. This moves said wire-guide $G^{10}$ out of the path of the perforating device $D^9$ and compresses the spring $G^{12}$, so that the instant the standard $D^{16}$ and foot $D^{17}$, together with the perforating device $D^9$, are raised the spring $G^{12}$ will expand and automatically move the lower end of the guide $G^{10}$ in line with the perforation in the printed matter or other article in order to conduct to and insure the insertion of the wire therein. As the sliding bar $D^3$ is lowered the angular end $E^5$ of the wiper $E^4$ will move, with said sliding bar $D^3$, out of the notch $E^3$ and onto the face of the lever E, as shown in Fig. 3. This will move the lower end of the lever E from the sliding bar $D^3$ and the upper end of the lever E, together with the movable work-support $E^6$, in the opposite direction, or toward and under the drill $D^9$, and the wiper $E^4$ is so placed on the sliding bar $D^3$ that just before or simultaneously with the drill entering the printed matter or other object the support $E^6$ will abut against the underside of said printed matter in such a position that the opening $E^7$ in said support $E^6$ will be in line with or directly under the drill $D^9$, and the drill $D^9$, in connection with said support $E^6$, will form a clean-cut perforation in said printed matter or other article without rough or ragged edges, and the shank $E^8$ of said support $E^6$ being held in the bearing $E^9$ at a diagonal position in relation to the table $b$ as said support is moved to and from said table it will be moved diagonally to and from the perforating device in order to avoid and completely prevent said support from displacing said printed matter or other article under and to and from which it is moved and also to prevent said support from interfering with the insertion of the wire in the perforation, and said wiper $E^4$ is so located on the sliding bar $D^3$ that the angular end $E^5$ of the wiper $E^4$ is held on the face of the lever E to hold the support $E^6$ in place until the perforation is formed and the drill withdrawn from the printed matter, and said disk $B^5$ travels in the direction of the arrow $x^{10}$ until the dog $B^{10}$ is moved slightly past the position shown in Fig. 3 or until said dog $B^{10}$ engages with the notch or shoulder $b^3$ of the slotted plate $B^{22}$ and also with the teeth of the ratchet-wheel $B^{14}$. Just at this moment the lower end of the pitman $B^2$, which moves with the rotating disk B, begins to move upward. This movement causes the disk $B^5$ to reciprocate backward in the direction of the arrow $x^{11}$, and as said disk $B^5$ reciprocates backward in said direction it carries the dog $B^{10}$, and said dog engaging with the ratchet-wheel $B^{14}$ the latter as well as the slotted plate $B^{22}$ are carried with said disk $B^5$, and one end of the spring $B^{24}$ being secured to the arm $B^{23}$ of the plate $B^{22}$ as the latter moves backward with the oscillating disk $B^5$ said spring $B^{24}$ is extended, and the shaft $B^3$ being rigidly secured to the ratchet-wheel $B^{14}$ the latter as well as the grooved feed-wheels C and $C^8$, toothed wheels $C'$ and $C^9$, and shaft $C^2$ are also operated, and as the grooved feed-wheels C and $C^8$ are rotated the wire $C^{11}$ is drawn by said feed-wheels from the spool $C^{13}$, through the wire-straightening rollers $C^{15}$ and $C^{16}$, through the tubular guide $C^{21}$ and fed into the groove $F^5$, and through the ring-former F and into the perforation in the printed matter or other article placed on the table $b$, and said feed-wheels C and $C^8$ feed said wire $C^{11}$ until the inner end of the dog $B^{10}$ is forced out of contact with the teeth of the ratchet-wheel $B^{14}$ by the eccentric periphery of the cam $B^{25}$ crossing the periphery of the ratchet-wheel $B^{14}$, the spring $B^{16}$ permitting the pawl or dog $B^{10}$ to be moved longitudinally back and freed from the teeth of the ratchet-wheel $B^{14}$ and clear from the shoulder $b^3$ of the slotted plate $B^{22}$, and the same instant that the dog $B^{10}$ is forced out of contact with the teeth of the ratchet-wheel $B^{14}$ the operation of feeding the wire $C^{11}$ is instantly stopped, and the same instant that the dog $B^{10}$ is disengaged from the shoulder $b^3$ of the slotted plate $B^{22}$ the latter will be free to be acted upon by the spring $B^{24}$, which will contract and instantly return said slotted plate $B^{22}$ to its normal position, the extent of the movement of said slotted plate backward being regulated by the pin $B^{20}$ engaging with the plate $B^{22}$ at the end of the slot $B^{21}$. Just as the operation of feeding the wire is stopped the lower end of the pitman $B^2$, which has been rotating with the disk B, begins to move in a downward direction, which reciprocates the disk $B^5$ back again in the direction of the arrow $x^{10}$ to operate the perforating mechanism, as has been hereinbefore described, and the length of wire $C^{11}$, which is fed to the ring-former F at one operation, is sufficient to form a ring or loop of one turn and is determined by the distance between the dog $B^{10}$ when first engaging with the teeth of the ratchet-wheel $B^{14}$ and the point at which the eccentric periphery of said cam $B^{25}$ crosses the periphery of the ratchet-wheel $B^{14}$, because at this point the pawl or dog $B^{10}$ is forced out of contact with the teeth of said ratchet-wheel $B^{14}$, so that by adjusting the outer end of the arm $B^{26}$ upward the point at which the eccentric periphery of said cam $B^{25}$ will cross the periphery of the ratchet-wheel $B^{14}$ will be closer to the pawl or dog $B^{10}$. Therefore the distance that the dog moves when in contact with the ratchet-wheel $B^{14}$ will be less. As a result the length of wire fed to the ring-former will be comparatively short. Again, by adjusting the arm $B^{26}$ downward the point at which the eccentric periphery of said cam $B^{25}$ will cross the periphery of said ratchet-wheel $B^{14}$ will be adjusted from the pawl or dog $B^{10}$. Therefore the distance that the dog $B^{10}$ moves when in contact with the ratchet-wheel will be greater. As a result the length of wire fed to the ring-former will be comparatively greater, and when the outer end of the arm $B^{26}$ is properly located it is rigidly held at that position by being clamped to the slotted bar $B^{28}$ by the bolt $B^{31}$ and winged nut $B^{32}$, and the radius of the slotted plate $B^{22}$ being slightly less than the longest radius of the cam $B^{25}$, but greater than the radius of the ratchet-wheel $B^{14}$ as the dog $B^{10}$ moves back to the position shown in Fig. 3, it will ride on the face of said plate $B^{22}$, and this will avoid and completely prevent the dog $B^{10}$ from wearing the teeth of said ratchet-wheel $B^{14}$ when returning to its normal position. The wire $C^{11}$ is fed into the groove $F^5$ of the inner section $F'$ of the ring-former F, as hereinbefore described, and is held from falling out of said groove $F^5$ by the adjacent longitudinal flange $F^3$ of the outer section $F^2$ of said ring-former F, and as said wire $C^{11}$ abuts against the upper curved end $F^6$ of said groove $F^5$ said curved end $F^6$ causes said wire to curve outward, and while curving outward it passes through the perforation in the printed matter or other article on the table $b$ and upward toward the upper curved end $F^6$ of the groove $F^5$ in the form of a ring or loop, and said table $b$ has an opening $F^9$ formed in it to facilitate and permit the passing of the wire through the perforation in the printed matter or other article placed on said table, and the side of the ring-former F is recessed or cut away at $F^7$ to permit the free end of the wire to lie close against the portion of the wire in the upper curved end $F^6$ of the groove $F^5$ after the wire ring or loop is formed, after which when the wire ring or loop is severed from the wire strand the ends are so close together that their resilience is sufficient to cause them to abut against each other and form a continuous wire ring or loop, and the wiper $H^{16}$ is so located on the disk $B^5$ that it is timed to engage with and operate the toe or arm $H^{15}$, as well as the shaft $H^{12}$ and right and left worms or cams $H^{13}$ and $H^{14}$ secured thereto, to act on the studs $H^4$ on the slides $H'$ and $H^2$, carrying the cutters $H^9$, to cause said cutters to move toward one another to cut off the wire ring $b^5$, which has just been formed and inserted in the printed matter or other article. When the sections $F'$ and $F^2$ of the ring-former F are secured together and held in the pivotal support $F^{11}$, as shown in Fig. 20, by turning the screw $F^{10}$ the inner section $F'$ is adjusted longitudinally on the section $F^2$, and a shorter or longer portion of the upper curved end $F^6$ of the groove $F^5$ will extend beyond the end of the section $F^2$, according to the direction the screw $F^{10}$ is turned, and by loosening the set-screw $F^{21}$ the ring-former F may be adjusted in a pivotal lateral direction to or from the perforation in the printed matter or other article placed on the table $b$, and by loosening the set-screw $F^{19}$ the ring-former may be adjusted vertically, and when said ring-former F is properly adjusted laterally and vertically it may be held in that position by tightening said set-screws $F^{21}$ and $F^{19}$. By lowering the outer end of the arm $B^{26}$ of the cam $B^{25}$ in the slotted bar $B^{28}$ a long portion of wire will be fed to the ring-former F, and by turning the screw $F^{10}$ so that a long portion of the upper curved end $F^6$ of the groove $F^5$ will extend beyond the end of the section $F^{10}$ a ring or loop of a single turn and of large diameter will be formed from said wire, and by adjusting said ring-former F in a pivotal lateral direction back from the perforation in the printed matter or other article and adjusting said ring-former vertically upward it is adapted to insert the wire into the perforation in the printed matter or other article as said wire is curved outward to form the loop or ring of large diameter, and by raising the arm $B^{26}$ of the cam $B^{25}$ in the slotted bar $B^{28}$ a short portion of wire will be fed to the ring-former F, and by turning the screw $F^{10}$ so that a short portion of the curved end $F^6$ of the groove $F^5$ will extend beyond the end of the section $F^2$ a ring or loop of a single turn and of small diameter will be formed from said wire, and by adjusting said ring-former F in a pivotal lateral direction toward the perforation in the printed matter or other article and by adjusting said ring-former vertically downward it is adapted to insert the wire in the perforation in the printed matter or other article as said wire is curved outward to form the loop or ring of small diameter, so that this machine may be set to form rings or loops of any diameter and also to insert said rings or loops of any diameter into the printed matter or other object placed on the top or table $b$, and by loosening the winged nut $G^{13}$ the arm $G'$ may be adjusted vertically to permit the printed matter or other article to extend under the inclined guide $G^{10}$ for the purpose of holding the sheets of printed matter tightly together and for holding said printed matter or other article on the table $b$ while inserting and withdrawing the perforator and while inserting the ring or loop in the perforation, and the inclined face of said guide could be adjusted so that the lower edge would be in line with one side of the perforation in the printed matter or other article on the table $b$ in order to guide and insure the passing of the wire into said perforation, after which said arm $G'$ and guide $G^{10}$ could be held in said position by tightening the winged nut $G^{13}$. As a result a machine is provided that will perforate sheets of printed matter or other article and form and insert a ring or loop of any required size therein and leave the latter in the perforation in the printed matter or other article for the purpose of suspension, and all of these operations being accomplished and not necessitating the handling of the wire by the operator said rings are rapidly formed and inserted. Consequently this result will be accomplished economically.

I have found by experiment that the construction herein shown and described gives the best results. At the same time while I prefer the said construction I do not wish to limit myself to the details thereof, as they may be modified in various ways without departing from the spirit of my invention.

Having thus described my invention, I claim—

1. In a machine of the class described, a wiper, D, and means for supporting and operating the same, in combination with a sliding bar, $D^3$, a toe, $D'$, pivotally supported on said sliding bar, a stop, $D^2$, rigidly secured to said sliding bar to hold said toe from moving away from said wiper when the latter is moving said sliding bar downward, a head, $D^5$, secured to the upper end of said sliding bar, and a perforating device, $D^9$, carried by said head, substantially as and for the purpose set forth.

2. In a machine of the class described, an oscillating disk, $B^5$, means for supporting and operating the same, and a wiper, D, secured to said disk, in combination with a sliding bar, $D^3$, a toe, $D'$, pivotally supported on said sliding bar, a stop, $D^2$, rigidly secured to said sliding bar to hold said toe from moving away from said wiper when the latter is moving said sliding bar downward, a spring, $D^4$, for returning said sliding bar to its normal position, a head, $D^5$, secured to the upper end of said sliding bar, and a perforating device, $D^9$, carried by said head, substantially as and for the purpose set forth.

3. In a machine of the class described, an oscillating disk, $B^5$, means for supporting and operating the same, and a wiper, D, secured to said disk, in combination with a sliding bar, $D^3$, a toe, $D'$, pivotally supported on said sliding bar, a stop, $D^2$, rigidly secured to said sliding bar to hold said toe from moving away from said wiper when the latter is moving said sliding bar downward, a spring, $D^4$, for returning said sliding bar to its normal position, a head, $D^5$, secured to the upper end of said sliding bar, a rotating spindle, $D^6$, supported in said head, a drill, $D^9$, and pulley-wheel, $D^{11}$, secured to said spindle, and means for operating said pulley-wheel, substantially as and for the purpose set forth.

4. In a machine of the class described, an oscillating disk, $B^5$, means for supporting and operating the same, a wiper, D, secured to said disk, a sliding bar, $D^3$, a toe, $D'$, pivotally supported on said sliding bar, a stop, $D^2$, rigidly secured to said sliding bar to hold said toe from moving away from said wiper when the latter is moving said sliding bar downward, a head, $D^5$, secured to the upper end of said sliding bar, a socket, $D^{20}$, formed in and a perforating device, $D^9$, secured to said head, in combination with an independently-moving standard, $D^{16}$, a foot, $D^{17}$, formed on said standard, a circular aperture, $D^{18}$, formed in said foot, a guide, $D^{19}$, secured to said standard, and fitted to and inserted in said socket in said head, and a compression-spring, $D^{21}$, secured at one end to said standard and at the other end to said head, substantially as and for the purpose set forth.

5. In a machine of the class described, a movable work-support, $E^6$, in which an opening or recess, $E^7$, is formed and means for supporting said movable work-support, in combination with and pivotally secured to a lever, E, a notch, $E^3$, formed in said lever, a wiper, $E^4$, formed with an angular end, $E^5$, and means for operating said wiper, substantially as and for the purpose set forth.

6. In a machine of the class described, a movable work-support, $E^6$, in which an opening or recess, $E^7$, is formed and means for supporting said movable work-support, in combination with and pivotally secured to a lever, E, a notch, $E^3$, formed in said lever, a wiper, $E^4$, formed with an angular end, $E^5$, a sliding bar, $D^3$, to which said wiper is secured, and means for operating said sliding bar, substantially as and for the purpose set forth.

7. In a machine of the class described, a head, $D^5$, means for supporting the same, a perforating device, $D^9$, secured to said head, an independently-moving standard, $D^{16}$, supported in said head, a foot, $D^{17}$, formed on said standard, a circular aperture, $D^{18}$, formed in said foot, and a compression-spring, $D^{21}$, secured at one end to said standard and at the other end to said head, in combination with a movable work-support, $E^6$, and means for supporting and operating the same, substantially as and for the purpose set forth.

8. In a machine of the class described, a head, $D^5$, a rotating spindle, $D^6$, supported in said head, a perforating device, $D^9$, and a pulley-wheel, $D^{11}$, secured to said spindle, and means for operating said pulley-wheel, an independently-moving standard, $D^{16}$, supported in said head, a foot, $D^{17}$, formed on said standard, a circular aperture, $D^{18}$, formed in said foot and a compression-spring, $D^{21}$, secured at one end to said standard and at the other end to said head, in combination with a movable work-support, $E^6$, substantially as and for the purpose set forth.

9. In a machine of the class described, an oscillating disk, $B^5$, means for supporting and operating the same, a wiper, D, secured to said disk, a sliding bar, $D^3$, a toe, $D'$, pivotally supported on said sliding bar, a stop, $D^2$, rigidly secured to said sliding bar to hold said toe from moving away from said wiper when the latter is moving said sliding bar downward, a spring, $D^4$, for returning said sliding bar to its normal position, a bracket, $d'$, through which said sliding bar, $D^3$, extends, a washer, $d^2$, secured to said sliding bar to prevent the latter from being withdrawn from said bracket by said spring, a head, $D^5$, secured to the upper end of the sliding bar, $D^3$, a socket, $D^{20}$, formed in said head, a perforating device, $D^9$, secured to said head, and an independently-moving standard, $D^{16}$, supported in said head, a foot, $D^{17}$, formed on said standard, a circular aperture, $D^{18}$, formed in said foot, a compression-spring, $D^{21}$, secured at one end to said standard, and at the other end to said head, and a guide, $D^{19}$, secured to said standard and fitted to and inserted in said socket in said head, in combination with a movable work-support, $E^6$, moving diagonally to and from said perforating device, substantially as and for the purpose set forth.

10. In a machine of the class described, an oscillating disk, $B^5$, a wiper, D, secured to said disk, a sliding bar, $D^3$, a toe, D', pivotally supported on said sliding bar, a stop, $D^2$, rigidly secured to said sliding bar to hold said toe from moving away from said wiper when the latter is moving said sliding bar downward, a wiper, $E^4$, and a head, $D^5$, secured to said sliding bar, a perforating device, $D^9$, secured to said head, an independently-moving standard, $D^{16}$, supported in said head, and a compression-spring, $D^{21}$, secured at one end to said standard and at the other end to said head, in combination with a movable work-support, $E^6$, and a lever, E, pivotally secured to said movable work-support, substantially as and for the purpose set forth.

11. In a machine of the class described, an oscillating disk, $B^5$, a wiper, D, secured to said disk, a sliding bar, $D^3$, a toe, D', pivotally supported on said sliding bar, a stop, $D^2$, rigidly secured to said sliding bar to hold said toe from moving away from said wiper when the latter is moving said sliding bar downward, a wiper, $E^4$, secured to said sliding bar and formed with an angular end, $E^5$, a head, $D^5$, secured to the upper end of said sliding bar, a socket, $D^{20}$, formed in and a perforating device, $D^9$, secured to said head, an independently-moving standard, $D^{16}$, supported in said head, a foot, $D^{17}$, formed on said standard, a circular aperture, $D^{18}$, formed in said foot, a compression-spring, $D^{21}$, secured at one end to said standard, and at the other end to said head, and a guide, $D^{19}$, secured to said standard and fitted to and inserted in said socket in said head, in combination with a movable work-support, $E^6$, a lever, E, in which a notch, $E^3$, is formed, and pivotally secured near one end of said movable work-support, substantially as and for the purpose set forth.

12. A ring-former consisting of an inner section, F', in which a groove, $F^5$, curved outward at the upper end is formed, in combination with an outer section, $F^2$, provided with longitudinal flanges, $F^3$, and means for supporting said sections and holding them together, substantially as and for the purpose set forth.

13. A ring-former consisting of an inner section, F', in which a groove, $F^5$, curved outward at the upper end is formed, in combination with an outer section, $F^2$, formed with longitudinal flanges, $F^3$, and means for supporting said sections, holding them together, and for adjusting one section longitudinally on the other, substantially as and for the purpose set forth.

14. A ring-former consisting of an inner section, F', in which a groove, $F^5$, curved outward at the upper end is formed and an overhanging forked end, $F^8$, formed on said section, in combination with an outer section, $F^2$, formed with longitudinal flanges, $F^3$, and with a cross-flange, $F^4$, a screw-threaded socket formed in said cross-flange, and a double-headed screw, $F^{10}$, secured in said screw-threaded socket, and engaging with the overhanging forked end of the inner section, substantially as and for the purpose set forth.

15. A ring-former consisting of an inner section, F', in which a groove, $F^5$, curved outward at the upper end is formed, in combination with an outer section, $F^2$, provided with the flanges, $F^3$, a recess, $F^7$, formed in said sections, and means for supporting said sections and holding them together, substantially as and for the purpose set forth.

16. A ring-former consisting of an inner section, F', in which a groove, $F^5$, curved outward at the upper end is formed, in combination with an outer section, $F^2$, formed with longitudinal flanges, $F^3$, a recess, $F^7$, formed in said sections, and means for supporting said sections, holding them together and for adjusting one section longitudinally on the other, substantially as and for the purpose set forth.

17. A ring-former consisting of an inner section, F', in which a groove, $F^5$, curved outward at the upper end is formed, and an overhanging forked end, $F^8$, formed on said section, in combination with an outer section $F^2$, formed with longitudinal flanges, $F^3$, and with a cross-flange, $F^4$, a screw-threaded socket formed in said cross-flange, a double-headed screw, $F^{10}$, secured in said screw-threaded socket, and engaging with the overhanging forked end of the inner section, and a recess, $F^7$, formed in said sections, substantially as and for the purpose set forth.

18. A ring-former consisting of an inner section, F', and an outer section, $F^2$, in combination with a socketed support, $F^{11}$, in the socket in which the lower ends of said sections are inserted and held together, and a bracket, $F^{13}$, to which said support is pivotally secured, substantially as and for the purpose set forth.

19. The horizontally-adjustable slide, $F^{18}$, the slide, $F^{15}$, vertically adjustable on said horizontal slide, and an arm, $F^{14}$, secured to said vertically-adjustable slide, in combination with a ring-former, F, pivotally secured to the arm, $F^{14}$, substantially as and for the purpose set forth.

20. The horizontally-adjustable slide, $F^{18}$, the slide, $F^{15}$, vertically adjustable on said horizontal slide and an arm, $F^{14}$, secured to said vertically-adjustable slide, in combination with a ring-former, F, provided with a stud, $F^{16}$, a socketed support, $F^{11}$, in the socket in which the lower end of said ring-former is inserted and held together, and a bracket, $F^{13}$, to which said support is pivotally secured, substantially as and for the purpose set forth.

21. The horizontally-adjustable slide, $F^{18}$, the slide, $F^{15}$, vertically adjustable on said horizontal slide, and an arm, $F^{14}$, secured to said vertically-adjustable slide, in combination with a ring-former, formed in two sections, F', and $F^2$, means for holding said sections together and for adjusting one longitudinally on or within the other, a stud, $F^{16}$, on said ring-former with which the arm, $F^{14}$, engages, a socketed support, $F^{11}$, in which the lower end of said sections, $F'$, and $F^2$, are inserted and held together, and a bracket, $F^{13}$, to which said support is pivotally secured, substantially as and for the purpose set forth.

22. In a machine of the class described, a shaft, $B^3$, a ratchet-wheel, $B^{14}$, fixed on said shaft, a cam, $B^{25}$, mounted loosely on said shaft, and provided with an arm, $B^{26}$, and a stationary bar, $B^{28}$, to which said arm is adjustably secured, in combination with a dog, $B^{10}$, in which an elongated opening, $B^9$, and socket, $B^{16}$, is formed and which is provided with an arm, $B^{12}$, an oscillating disk, $B^5$, in which an elongated slot, $B^{13}$, is formed to receive the arm, $B^{12}$, and a stud or pin, $B^{11}$, for holding said dog against the face of said disk, and a spring $B^{15}$, inserted in the socket, $B^{16}$, and means for operating said disk, substantially as and for the purpose set forth.

23. In a machine of the class described, the grooved feed-wheels, C, and, $C^8$, and means for supporting and operating said wheels, a shaft, $B^3$, a ratchet-wheel, $B^{14}$, fixed on said shaft, a cam, $B^{25}$, mounted loosely on said shaft, and provided with an arm, $B^{26}$, and a stationary bar, $B^{28}$, to which said arm is adjustably secured, in combination with a dog, $B^{10}$, in which an elongated opening, $B^9$, and socket, $B^{16}$, is formed, and which is provided with an arm, $B^{12}$, an oscillating disk, $B^5$, in which an elongated slot, $B^{13}$, is formed to receive the arm $B^{12}$, and a stud or pin, $B^{11}$, for holding said dog against the face of said disk and a spring, $B^{15}$, inserted in the socket, $B^{16}$, and means for operating said disk, substantially as and for the purpose set forth.

24. In a machine of the class described, the shaft, $B^3$, the ratchet-wheel, $B^{14}$, fixed on said shaft, a cam, $B^{25}$, mounted loosely on said shaft and provided with an arm, $B^{26}$, and means for holding the latter at the position to which it may be adjusted in combination with a plate, $B^{22}$, mounted loosely on said shaft and means for operating and limiting the movement of said plate, substantially as and for the purpose set forth.

25. In a machine of the class described, the shaft $B^3$, a ratchet-wheel, $B^{14}$, fixed on said shaft, a cam, $B^{25}$, mounted loosely on said shaft, and provided with an arm, $B^{26}$, a bar $B^{28}$, to which said arm is adjustably secured, a dog, $B^{10}$, and means for supporting and operating the latter, in combination with a slotted plate, $B^{22}$, provided with a shoulder, $b^3$, and an arm, $B^{23}$, an elongated slot, $B^{21}$, formed in said plate, a pin, $B^{20}$, secured to a rigid support and resting in said slot in said plate and a spring, $B^{24}$, connected at one end to said arm, and at the other end to a stationary support, substantially as and for the purpose set forth.

26. In a machine of the class described, the shaft, $B^3$, ratchet-wheel, $B^{14}$, fixed on said shaft, a cam, $B^{25}$, mounted loosely on said shaft and provided with an arm, $B^{26}$, and means for holding said arm at the position to which it may be adjusted, a slotted plate, $B^{22}$, provided with a shoulder, $b^3$, and an arm, $B^{23}$, an elongated slot, $B^{21}$, formed in said slotted plate, a spring, $B^{24}$, connected at one end to said arm and at the other end to a stationary support, a stationary sleeve, $B^7$, a flanged sleeve, $B^{17}$, and a pin, $B^{20}$, for securing said flanged sleeve to said stationary sleeve, in combination with a dog, $B^{10}$, in which an opening, $B^9$, and socket, $B^{16}$, are formed, an arm, $B^{12}$, formed on said dog, a stud or pin, $B^{11}$, a spring, $B^{15}$, located in said socket, $B^{16}$, an oscillating disk, $B^5$, in which an elongated slot, $B^{13}$, is formed, and a sleeve, $B^6$, on said disk, substantially as and for the purpose set forth.

27. In a machine of the class described, the slide-box, H, secured to a fixed support, cutter-carrying slides, $H'$, and, $H^2$, supported in said box, a cutter, $H^9$, and a stud, $H^4$, secured to each of said cutter-carrying slides, and an antifriction-sleeve, $H^5$, supported on each of said studs in combination with the rock-shaft, $H^{12}$, and the right and left worms, $H^{13}$, and, $H^{14}$, formed on said shaft, substantially as and for the purpose set forth.

28. In a machine of the class described, the slide-box, H, secured to a fixed support, cutter-carrying slides, $H'$, and, $H^2$, supported in said box, a cutter, $H^9$, and a stud, $H^4$, secured to each of said cutter-carrying slides and an antifriction-sleeve supported on each of said studs, in combination with a rock-shaft, $H^{12}$, worms, $H^{13}$, and, $H^{14}$, formed on said shaft, a toe, $H^{15}$, secured to said shaft, a wiper, $H^{16}$, for operating said toe, an oscillating disk, $B^5$, for supporting and operating said wiper, and means for operating said disk, substantially as and for the purpose set forth.

29. The combination of a former in which a groove $F^5$, curved outward at the upper end is formed for forming rings and simultaneously with their formation, inserting them in perforations in articles for the purpose of suspension, means for feeding wire to the ring-forming mechanism, a dog, a ratchet, and means for operating them to intermittently feed the wire to the ring-forming mechanism, substantially as described.

30. The combination of a former constructed in two sections in one of which sections a groove, $F^5$, curved outward at the upper end is formed for forming rings and said sections adjustable on one another to form rings of different diameter, and simultaneously with their formation, inserting them in perforations in articles, for the purpose of suspension, means for feeding wire to the ring-forming mechanism, a dog, a ratchet, and means for operating them to intermittently feed the wire to the ring-forming mechanism, and for causing the amount of wire presented to the wire-feeding mechanism to vary to accord with the diameter of the ring, substantially as described.

31. The combination of means for forming perforations in articles, means for operating and alternately throwing the perforating mechanism in and out of operation, means for forming rings and simultaneously with their formation inserting them in perforations in said articles for the purpose of suspension, a dog, a ratchet, and means for operating them to intermittently feed the wire to the ring-forming mechanism, substantially as described.

32. The combination of means for forming perforations in articles, means for operating and alternately throwing the perforating mechanism in and out of operation, adjustable means for forming rings, of different diameter and simultaneously with their formation inserting them in the perforations in said articles for the purpose of suspension, means for feeding the wire to the ring-forming mechanism, a cam, a ratchet-wheel and dog and means for operating them to cause the amount of wire presented to the wire-feeding mechanism to vary to accord with the diameter of the ring required, substantially as described.

33. The combination of means for forming perforations in articles consisting of a vertically-adjustable sliding bar carrying rotating perforating mechanism, means for operating and alternately throwing the perforating mechanism in and out of operation, a former in which a groove, $F^5$, curved outward at the upper end is formed for forming rings, and simultaneously with their formation inserting them in the perforations in said articles for the purpose of suspension, a dog, a ratchet, and means for operating them to intermittently feed the wire to the ring-forming mechanism, substantially as described.

34. The combination of means for forming perforations in articles, consisting of an adjustable sliding bar and an adjustable standard provided with a foot, and a compression-spring by which said standard is automatically adjusted to the thickness of the article, and to firmly hold the article while the perforation is being formed therein, and while withdrawing the perforating device therefrom, means for operating and alternately throwing the perforating mechanism in and out of operation, a former in which a groove, $F^5$, curved outward at the upper end is formed for forming rings and simultaneously with their formation inserting them in the perforations in said articles for the purpose of suspension, a dog, a ratchet and means for operating them to intermittently feed the wire to the ring-forming mechanism, substantially as described.

35. The combination of means for forming perforations in articles, consisting in part of a work-support moving diagonally to and from the perforating mechanism, means for operating and alternately throwing the perforating mechanism in and out of operation, means for alternately positioning the work-support toward the perforating mechanism, for holding it under the perforating mechanism while the perforation is being formed, and for positioning it from the perforating mechanism, a former in which a groove, $F^5$, curved outward at the upper end is formed, for forming rings and simultaneously with their formation inserting them in the perforations in said articles for the purpose of suspension, a dog, a ratchet and means for operating them to intermittently feed the wire to the ring-forming mechanism, substantially as described.

36. The combination of means for forming perforations in articles, consisting in part of a movable work-support, a lever formed with a notch, and a wiper formed with an angular end for the purpose of operating said lever and positioning the movable work-support under the perforating device, means for operating and alternately throwing the perforating mechanism in and out of operation, a former in which a groove, $F^5$, curved outward at the upper end is formed, for forming rings, and simultaneously with their formation inserting them in the perforations in said articles, for the purpose of suspension, a dog, a ratchet and means for operating them to intermittently feed the wire to the ring-forming mechanism, substantially as described.

37. The combination of a former in which a groove, $F^5$, curved outward at the upper end is formed, for forming rings, and simultaneously with their formation inserting them in perforations in articles, for the purpose of suspension, means for feeding wire to the ring-forming mechanism, a dog, a ratchet and means for operating them to intermittently feed the wire to the ring-forming mechanism, means for severing the ring from the wire and means for operating the severing mechanism when required, substantially as described.

38. The combination of a former constructed in two sections in one of which sections a groove, $F^5$, curved outward at the upper end is formed for forming rings, and said sections adjustable on one another to form rings of different diameter, and simultaneously with their formation inserting them in articles, for the purpose of suspension, means for feeding the wire to the ring-forming mechanism, a cam, $B^{25}$, a ratchet-wheel, $B^{14}$, and a longitudinally-adjustable dog, $B^{10}$, and means for operating them to cause the amount of wire presented to the wire-feeding mechanism to vary to accord with the diameter of the ring required, substantially as described.

39. The combination of means for forming rings and simultaneously with their formation, inserting them in perforations in articles for the purpose of suspension, a dog, a ratchet and means for operating them to intermittently feed the wire to the ring-forming mechanism, and means for preventing the dog from engaging with the ratchet when said dog is returning to its normal position, substantially as described.

40. The combination of means for forming perforations in articles, a former in which a groove, F⁵, curved outward at the upper end is formed, for forming rings and simultaneously with their formation inserting them in perforations in said articles for the purpose of suspension, a dog, a ratchet and means for operating them to intermittently feed the wire to the ring-forming mechanism, means for severing the ring from the wire, and means for stopping the machine at a given point, or just after the operation of perforating, forming, inserting and cutting off the ring is completed, substantially as described.

In testimony whereof I have signed in the presence of the two undersigned witnesses.

THOMAS HAWTHORNE.

Witnesses:
P. J. EDMUNDS,
S. McBAIN.